(12) United States Patent
Zhu

(10) Patent No.: US 9,450,883 B2
(45) Date of Patent: Sep. 20, 2016

(54) MANAGING REDIRECTED WEBSITE LOGIN USING A SHORT ADDRESS

(71) Applicant: Alibaba Group Holding Limited, George Town (KY)

(72) Inventor: Zhiqiang Zhu, Hangzhou (CN)

(73) Assignee: Alibaba Group Holding Limited (KY)

( * ) Notice: Subject to any disclaimer, the term of this patent is extended or adjusted under 35 U.S.C. 154(b) by 193 days.

(21) Appl. No.: 14/224,862

(22) Filed: Mar. 25, 2014

(65) Prior Publication Data

US 2014/0297863 A1 Oct. 2, 2014

(30) Foreign Application Priority Data

Apr. 2, 2013 (CN) .......................... 2013 1 0113141

(51) Int. Cl.
*G06F 15/173* (2006.01)
*H04L 12/911* (2013.01)
*H04L 29/06* (2006.01)
*G06F 17/30* (2006.01)
*H04L 29/08* (2006.01)
*H04L 29/12* (2006.01)

(52) U.S. Cl.
CPC ......... *H04L 47/70* (2013.01); *G06F 17/30887* (2013.01); *H04L 61/6072* (2013.01); *H04L 63/08* (2013.01); *H04L 67/02* (2013.01); *H04L 67/2814* (2013.01); *H04L 61/10* (2013.01); *H04L 61/301* (2013.01); *H04L 67/04* (2013.01)

(58) Field of Classification Search
USPC ........................................................ 709/225
See application file for complete search history.

(56) References Cited

U.S. PATENT DOCUMENTS

| | | | |
|---|---|---|---|
| 7,568,107 B1* | 7/2009 | Rathi | G06F 21/41 713/182 |
| 7,908,317 B2 | 3/2011 | Musson | |
| 2004/0068579 A1* | 4/2004 | Marmigere | H04L 29/06 709/242 |
| 2005/0235044 A1* | 10/2005 | Tazuma | G06F 17/30887 709/217 |
| 2006/0185021 A1 | 8/2006 | Dujari et al. | |
| 2009/0187970 A1* | 7/2009 | Mower | H04L 67/025 709/225 |
| 2009/0313261 A1* | 12/2009 | Corella | H04L 63/08 |
| 2010/0281041 A1* | 11/2010 | Almeida | G06F 17/30867 707/755 |
| 2011/0295990 A1 | 12/2011 | St. Jean et al. | |
| 2012/0047577 A1 | 2/2012 | Costinsky | |
| 2013/0024535 A1* | 1/2013 | Zhang | G06F 17/30876 709/206 |
| 2013/0104202 A1* | 4/2013 | Yin | G06F 21/42 726/5 |

OTHER PUBLICATIONS

Mike Pope. "Login redirection (and back) in asp.net" May 8, 2012, pp. 1-2, http://mikepope.com/blog/AddComment.aspx?blogid=2374, retrieved Sep. 9, 2014.

* cited by examiner

*Primary Examiner* — Richard G Keehn
(74) *Attorney, Agent, or Firm* — Van Pelt, Yi & James LLP

(57) ABSTRACT

Managing website access for a user who is initially not logged in to the website includes: receiving a request sent by the user via a client to access a webpage that requires the user to log into the website, the request comprising an original page address of the webpage; encoding at least a portion of the original page address to generate an encoded portion; generating a short address that includes the encoded portion; redirecting the client using the short address; maintaining a mapping of at least the encoded portion and the original page address; redirecting the client to a login server for the user to perform login using a login address that is based at least in part on the short address; redirecting the client based at least in part on the short address; and determining the original page address.

17 Claims, 5 Drawing Sheets

MANAGING REDIRECTED WEBSITE LOGIN USING A SHORT ADDRESS

CROSS REFERENCE TO OTHER APPLICATIONS

This application claims priority to People's Republic of China Patent Application No. 201310113141.X entitled METHOD, DEVICE AND SYSTEM FOR LOGGING INTO PAGES, filed Apr. 2, 2013 which is incorporated herein by reference for all purposes.

FIELD OF THE INVENTION

The present application relates to the field of computer networks. In particular, it relates to a method, device, and system for logging into pages during network access.

BACKGROUND OF THE INVENTION

When users browse pages, they sometimes encounter a situation where they need to log in to a website before they can continue to browse pages on the site. If a user is detected as not being logged in, the browser will be redirected to the login page. After login is completed, the browser returns to the original page that the user wanted to browse. This process is sometimes referred to as a login jump. FIG. 1 is a diagram illustrating an example network processing flow for a login jump operation. The user has not logged in. The client browser is used to access the page that requires login. The client browser issues a hypertext transfer protocol (HTTP) request. The server receives the page requested by the user, e.g., the website server/page server, etc. After the server receives the requested page, it will assess whether the user has logged in. If the user has not logged in, the server regards the page address of the user-requested page as a parameter and externally redirects the request to the login server. That is, the server takes the universal resource locator (URL) as a parameter and externally redirects the request. After his request is redirected to the login server, the user completes the login process. Then, after the user logs in, the browser is externally redirected back to the user-requested web page. Lastly, the results from the requested web page are returned to the client browser, and the page is accessed.

In actual implementation, the browser is limited as to the length of the URL of the web page. That is, the accessed URL cannot be too long. The majority of existing websites have their own login servers which centrally process the login actions of website users. When the web page that a user needs to access requires login prior to access, the website will generally redirect the browser to the login server. After the user completes the login action, the server redirects the user's browser to the requested page (the actual/original page requested by the user). In order to complete this transfer, the user's browser, when being redirected to the login server, must carry the address of the page that was originally to be accessed so that the login server knows to which address the browser should be sent back after completing login. If the URL of the original page to be accessed by the user is very long and serves as a parameter, and it will be necessary to append the original URL (represented as a) to a new URL (represented as b), i.e., a+b=ab, the browser's URL length restriction may then be exceeded. In this case, the browser's buffer will not be able to properly keep the resulting new URL (ab), and the registration server cannot acquire the entire URL of the corresponding original page. Subsequently, the login server's redirecting back to the user-requested page may fail, or the login may fail. Thus, even if it is possible for the browser to arrive at the login page, the login may fail because of incomplete information; or the browser may fail to jump back to the original page after completing the login. Such failures can severely impact the user's experience.

In summary, in existing systems, a client sometimes experiences login failure or redirection failure because the redirected address used for access is too long.

BRIEF DESCRIPTION OF THE DRAWINGS

Various embodiments of the invention are disclosed in the following detailed description and the accompanying drawings.

DETAILED DESCRIPTION

Figure 1:
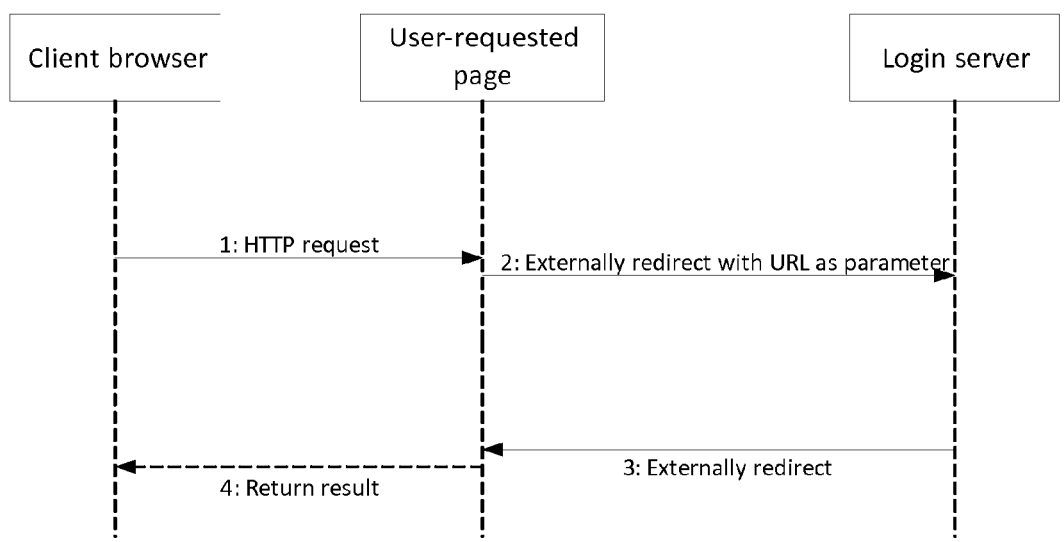
FIG. 1 is a diagram illustrating an example network processing flow for a login jump operation.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Managing website access for a user who is initially not logged into a website is disclosed. In some embodiments, a short address (also referred to as a short URL), that is substituted for a long URL, is used to redirect the client to a login server, thereby preventing login failure due to the length of the long URL. In some embodiments, external redirect is used to perform the redirect. Specifically, in response to the client's original request (e.g., an HTTP GET request to the original page address), the web server makes an external redirect by sending the client a response indicating that the requested page is unavailable and the client needs to make a different request at a new address, and closes the HTTP request. The client then makes a new HTTP request using this new address. In some embodiments, an internal rewrite is used to perform the redirect. Specifically, in response to the client's original request (e.g., an HTTP GET request to the original page address), the server replaces a portion of the file path associated with the address that is being requested with a new address, and send a response based on content that is at the new address.

Figure 2:
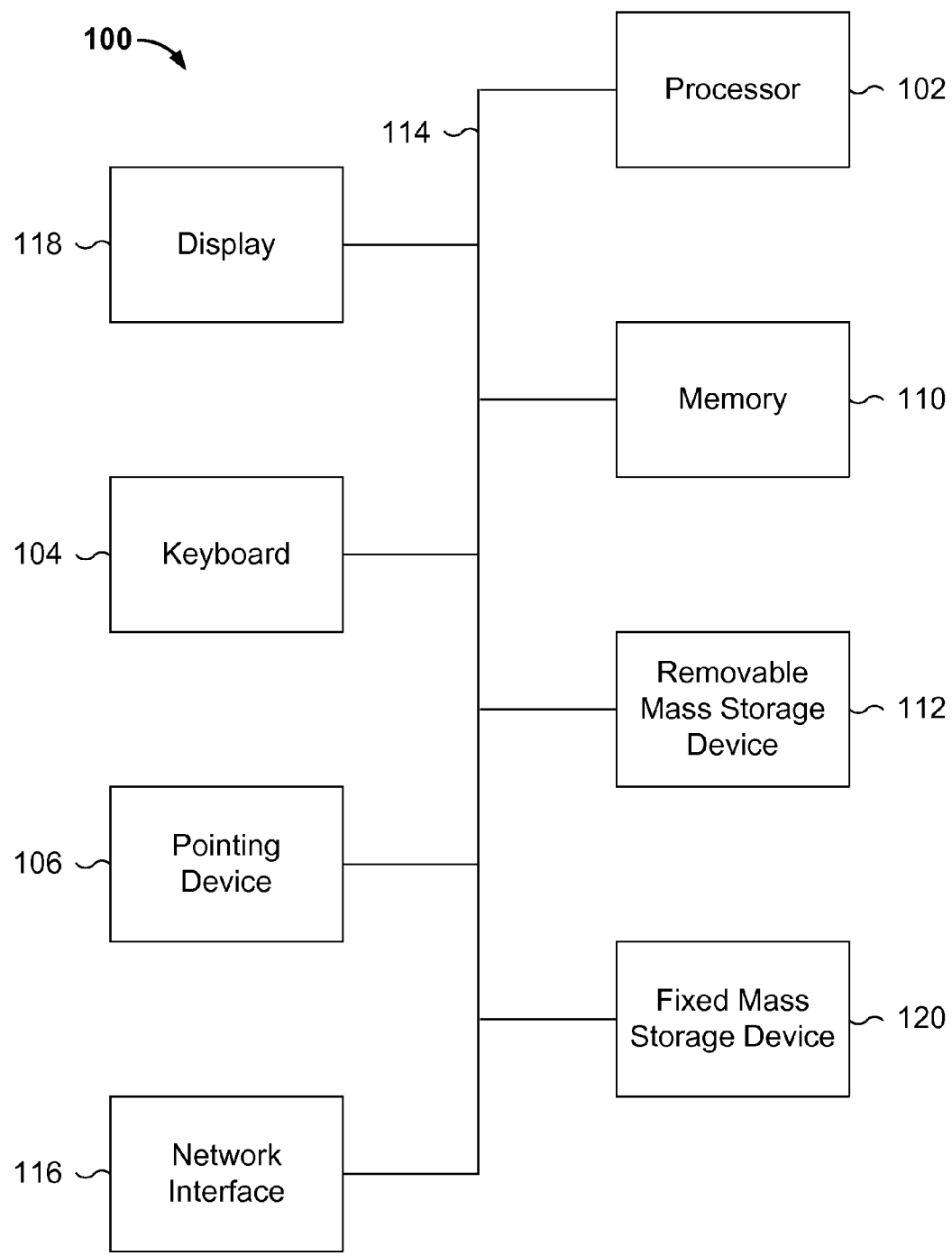
FIG. 2 is a functional diagram illustrating a programmed computer system for performing one or more steps in managing website access in accordance with some embodiments.

FIG. 2 is a functional diagram illustrating a programmed computer system for performing one or more steps in managing website access in accordance with some embodiments. As will be apparent, other computer system architectures and configurations can be used to perform one or more steps in managing website access. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, the processor 102 controls the reception and manipulation of input data, and the output and display of data on output devices (e.g., display 118). In some embodiments, processor 102 includes and/or is used to execute/perform the processes described below with respect to FIGS. 3 and 5.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 3:
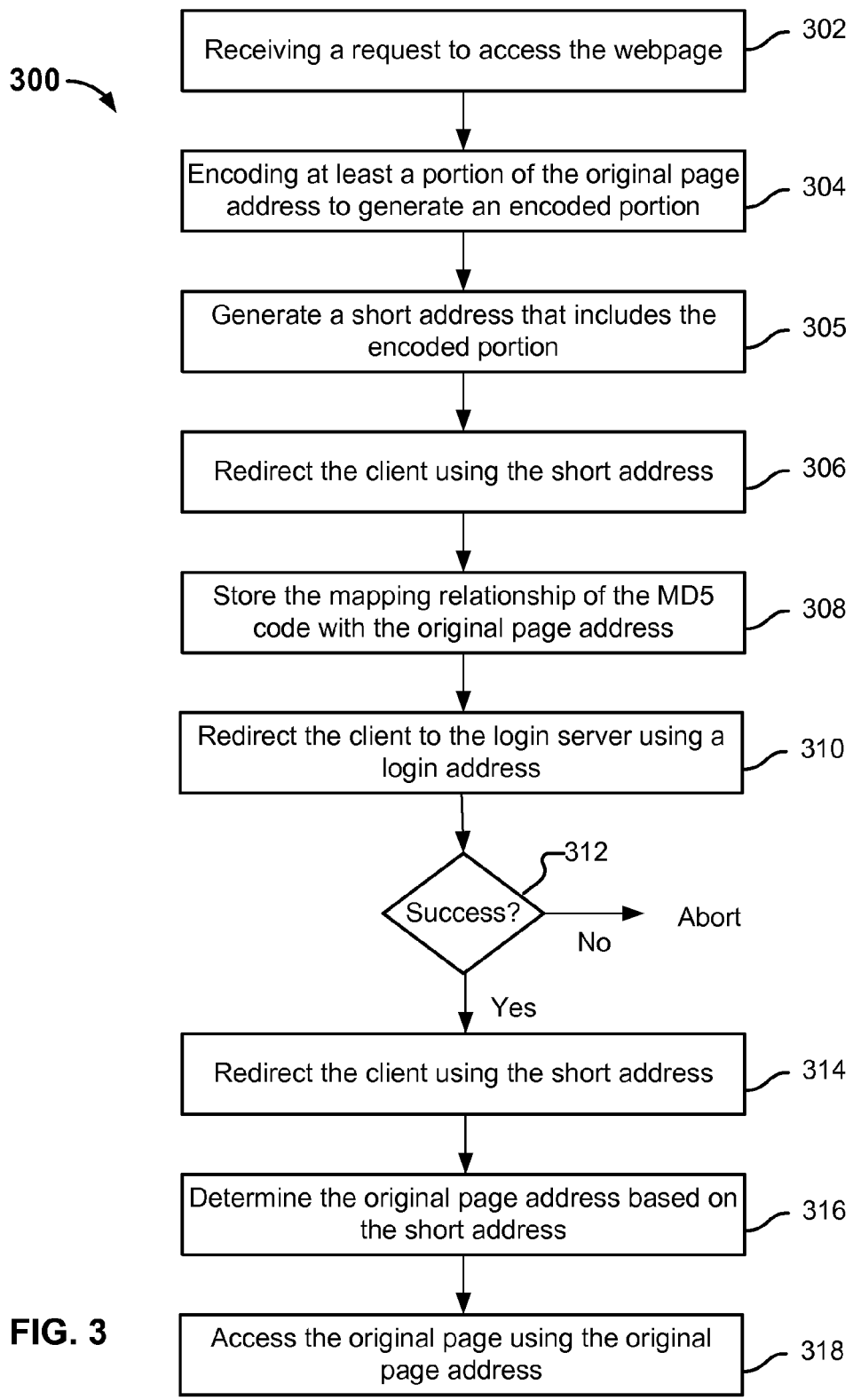
FIG. 3 is a flowchart illustrating an embodiment of a webpage access process.

FIG. 3 is a flowchart illustrating an embodiment of a webpage access process. Initially, the user is not logged into the website.

At 302, a request sent by the user via a client to access an original webpage address (also referred to as the original URL or original page address) is obtained. In some embodiments, 302 is performed by a web server such as 402 of FIG. 4, and in particular by its transceiver 404.

The request made by the user may be transmitted as, for example, an HTTP GET request from a client application (also referred to as the client) such as a browser or a standalone application. The request includes an original page address, which corresponds to the address (URL) of the page that the user wants to access. The user is permitted to access the content of the desired original page only after he has logged in to the website. If the user has not logged in, then it will be necessary to redirect the client to a login page to perform a login operation. The page can be accessed only after the login operation is successfully completed.

Because the client is redirected to the login page when the user is not logged in, there is a possibility that the combined URL of the original URL and the URL of the login server would be too long for the client to handle. To ensure that the user can login successfully once the client is redirected to the login server, at 304, at least a portion of the original page address is encoded to generate an encoded portion that is substantially shorter in length than at least the portion of the original page address that is encoded. At 305, a short address (also referred to as a short URL) comprising the encoded portion is generated. In some embodiments, this step is implemented by a web server such as 402 of FIG. 4, and in particular by its encoder 406.

In this example, the web server receives the HTTP request from the user, and determines whether the user has logged into the website. If it is determined that the user has not logged in, the original page address requested by the user is encoded. In some embodiments, a portion of the original page address is encoded; in some embodiments, the entire original page address is encoded. In some embodiments, a hashing technique such as MD5 is performed. In the following disclosure, MD5 is discussed extensively for purposes of example. Other encoding techniques where the output is shorter in length (e.g., having fewer bits/characters) than the input can be used. For example, the original page URL string is used as an input to an MD5 computation engine and the output (referred to as the MD5 code) is used to generate the short URL. In some embodiments, the MD5 code is combined with the domain name of the short URL management server address to generate a short URL. The domain name of the short URL management server address is preconfigured and known to the web server, making it possible to redirect to the short URL management server by identifying this domain name.

For example, let the original page address be represented as x/b.c where x represents the domain name (also referred to as the host name) of the page server (e.g., "example.com"), and b.c represents the path portion and may be a long alphanumeric string (e.g., "longurl.htm?param1=value1¶m2=value2&param3= value3¶m4=value4& param5=value5 . . . "). In some embodiments, the entire string is encoded and the result is represented as md5 string (e.g., "x8901"). In some embodiments, only the path portion is encoded, and the domain name is added back to the string, and the overall encoding resulting is represented as x/md5 (e.g., "example.com/ a4329"). For example, the domain or path name of the short URL management server address (a) can be "shorturl" or "shorturl.com." The domain name of the short URL management server is combined with the encoding result to generate the short URL represented as x/a/md5 or a/md5 (e.g., "example.com/shorturl/a4329" or "shorturl.com/ x8901". This new address can serve as a basis for an external redirect to the short URL management server.

In some embodiments, the short URL management server is configured inside the web server. For example, short URL management server 408 of FIG. 4 may be configured as a servlet of web server 402. Thus, the short URL management server and the web server have overlapping domain name. In this case, the original page address is encoded, and the domain name of the web server is retained. For example, let the short URL management server's domain name be "example.com/shorturl", and the original page address requested by the user be "http://example.com/longurl.htm? param1=value1¶m2=value2 . . . &paramn=valuen." MD5 encoding is performed on "longurl.htm?param1=value1& param2=value2 . . . &paramn=valuen" to obtain an MD5 code (represented using the variable md5) that is a much shorter alphanumeric string (e.g., the string "t1034k"). Based on the MD5 code and the short URL management server's intrinsic domain name, a resulting short URL has the form of "http://example.com/shorturl/t1034k." Specifically, the new address is generated by encoding the path portion of the original page address and then combining the result with the domain name (shorturl) of the short URL management server. This new address is used to externally redirect the client to the short URL management server. In some embodiments, the web server replaces the original page address URL that was requested with the new address, thus causing the client to receive a response from the short URL management server at the new address.

In some embodiments, the short management server is configured to be independent of the page server, and the servers have different domain names. In this case, the entire original page address is encoded. For example, let the domain name of the short URL server be "shorturl.com" and the original page address of the user request be "http:// example.com/ longurl.htm?param1=value1¶m2=value2 &paramn=valuen."

MD5 coding is performed on "example.com/ longurl.htm?param1=value1& param2=value2 . . . &paramn=valuen" to obtain an MD5 code "t1034k." Combining the short URL server's domain name with the MD5 code, the resulting short URL is "http://shorturl.com/ t1034k." This new address then serves as a basis for externally redirecting the client to the short URL management server, i.e., causing the client to locate the short URL management server with the domain name of "shorturl.com."

After the short URL is generated, at 306, the client is redirected to the short URL management server at the short URL. As discussed above, either external redirect or internal rewrite can be used to facilitate the redirection. From the user's perspective, the external redirect can be detected because the address field of the browser changes to the new address, and the internal rewrite is not discernible because the address field of the browser does not change.

Once the client is redirected to the short URL management server, at 308, the short management URL server stores the mapping of the MD5 code and the original page address.

At 310, the short management URL server further redirects the client to the login server which implements the login function.

In this example, the original page address is transmitted as a value of the corresponding code (e.g., as a parameter or value of the HTTP GET request) to the short URL management server. Other ways of transmission are permitted. The encoded form such as the MD5 code is saved into a buffer or other storage location of the short URL management server.

At 308, the mapping relationship of the MD5 code with the original page address is stored. In some embodiments, this step is performed by short URL management server 408 of FIG. 4. In some embodiments, the generated MD5 code is regarded as an identifier key (also referred to as an index) and the original page address as the value of the identifier key. Together they are saved as entries of a table in the short URL management server. In this way, a relationship is established between the MD5 code character string (key) and the original page address. For example: key1 corresponds to original page address 1, key2 corresponds to original page address 2, etc. Each key uniquely identifies an original page address. Key1 and key2 are two MD5 code strings obtained through MD5 encoding. The short URL generated from the corresponding original page address 1 includes key1, and the short URL generated from the corresponding original page address 2 includes key2. In this way, given the MD5 code character string (the key), it is possible to find the original page address.

At 310, the client is redirected to the login server using a login address that is based at least in part on the short address. In some embodiments, this step is performed by short URL management server 408 of FIG. 4. In this example, the short URL management server combines the short URL and the login server address to generate a new, combined login address. The new combined login server address is sent to the client as the address to which the client should be redirected. In response, the client sends a new request to the login server, which presents the login user interface for the user to complete user login. In some embodiments, the domain name of the login server is preconfigured so that the domain name can be included in the redirect request.

When the client is redirected to the login server, it is not necessary to include the original page address in the new combined login address; only the short URL is required to be included. The length of the new login address can be significantly shorter than if the original page address were included, therefore reducing the possibility of failure to reach the login server due to the length of the login server exceeding the limit supported by the client.

Continuing with the example above, let the original page address be represented as x/b.c (x representing the domain name of the page server). After the original page is encoded, the short URL that is generated is a/md5 or x/a/md5 (a representing the domain name of the short URL server). The resulting URL is far shorter than the original page address. Also, let the domain name of the login server address be represented as d. Thus, the login server address generated using the short URL (i.e., a/md5 or x/a/md5) as the parameter is represented as d/a/md5 or d/x/a/md5. In comparison, existing techniques combine the addresses without using encoding results in a login server address represented as d/x/b.c, which can be much longer in character length than the address represented as d/a/md5 or d/x/a/md5. In practice, d/a/md5 or d/x/a/md5 are sufficiently short and will not exceed the URL length limitation of the client, ensuring that the client will be redirected to the correct login server address. In addition, after login is completed, d/a/md5 or d/x/a/md5 can be used as a basis for returning to the short URL manager at domain of a. For example, d/a/md5 or d/x/a/md5 can be included in an HTTP request. The short URL manager analyzes the request, extracts the MD5 encoded form represented as md5 from the request, and uses md5 as a key to look up in the table the corresponding stored value, i.e., the original page address. Using the original page address, the client makes a request for the page that the user wants to access in the first place, and the request is received by the web server, which sends the page content to the client, which in turn renders the page for the user. The addresses involved in these steps should not fail because the URL used exceeds the browser limitation.

Later, after the user enters login credentials (e.g., user name and password) and successfully logs in, the client will be redirected to the short URL management server by making another HTTP GET request. The short URL management server uses the key (the MD5 code) to find the value (the original page address) for a subsequent redirect to the original page address of the user's HTTP request and then access to the page.

If login fails, the process is aborted at 312. If the login operation is successfully completed, at 314, the login server redirects the client to the short URL management server, using the short address that was included in the login address. The previously generated request for the login server includes the login server's address, as well as a short URL parameter specifying the short URL management server's address. This short URL can be extracted and used to redirect the client to the short URL management server. Continuing with the above-described example, the short URL parameter a/md5 is extracted from d/a/md5 or d/x/a/md5. The client is redirected to the short URL management server which has a domain name of a, using the short address a/md5.

At 316, the original page address is determined based on the short address. In some embodiments, this step is performed by login server 412 of FIG. 4. The short URL management server extracts the encoded portion (the MD5 code or md5 in the example above) from the short URL that is sent by the client's request and determines the original page address using the encoded portion. When this short URL is generated, it is generated in combination with the MD5 code. Therefore, the formatting of the short URL is pre-established and the encoded portion (the MD5 code character string) can be extracted from the short URL based on the known format. As described above, the correspondence relationship of the MD5 code with the original page address value was previously saved in a table on the short URL management server. Using the MD5 code extracted from the short URL as a key, the corresponding original page address can be looked up.

At 318, the original page address is used to access the page originally requested by the user. Specifically, the client makes a request using the original page address. At this point, the user has already logged on successfully and is permitted to access the requested page, and the short URL management server redirects the client to the originally requested page. Depending on implementation, internal rewrites and/or external redirects can be used to redirect the client. Specifically, if the short URL management server is built into the page server and the servers share the same domain name, then the redirecting of the client is done through an internal rewrite. To continue with the above example, in the built-in approach, the short URL server modifies the request but does not change the domain name. For example, a short URL of http://example.com/shorturl/t1034k is modified by the short URL management server to http://example.com/longurl.htm?param1=value1¶m2=value2 . . . &paramn=valuen, where the domain name "example.com" is not changed. The address field in a browser client does not change. If the short URL management server is placed externally to the page server and the servers do not share a domain name, then the external redirect approach is still employed. For example, the short URL server tells the client to change the short URL of "http://shorturl.com/t1034k" to "http://example.com/longurl.htm?param1=value1¶m2=value2 . . . &paramn=valuen" in a response/redirect message. In a browser client, the address field will change.

After the client is redirected to access the page originally requested by the user, the web server provides the content of the page to the client, which renders the page. The login jump operation is completed.

Figure 4:
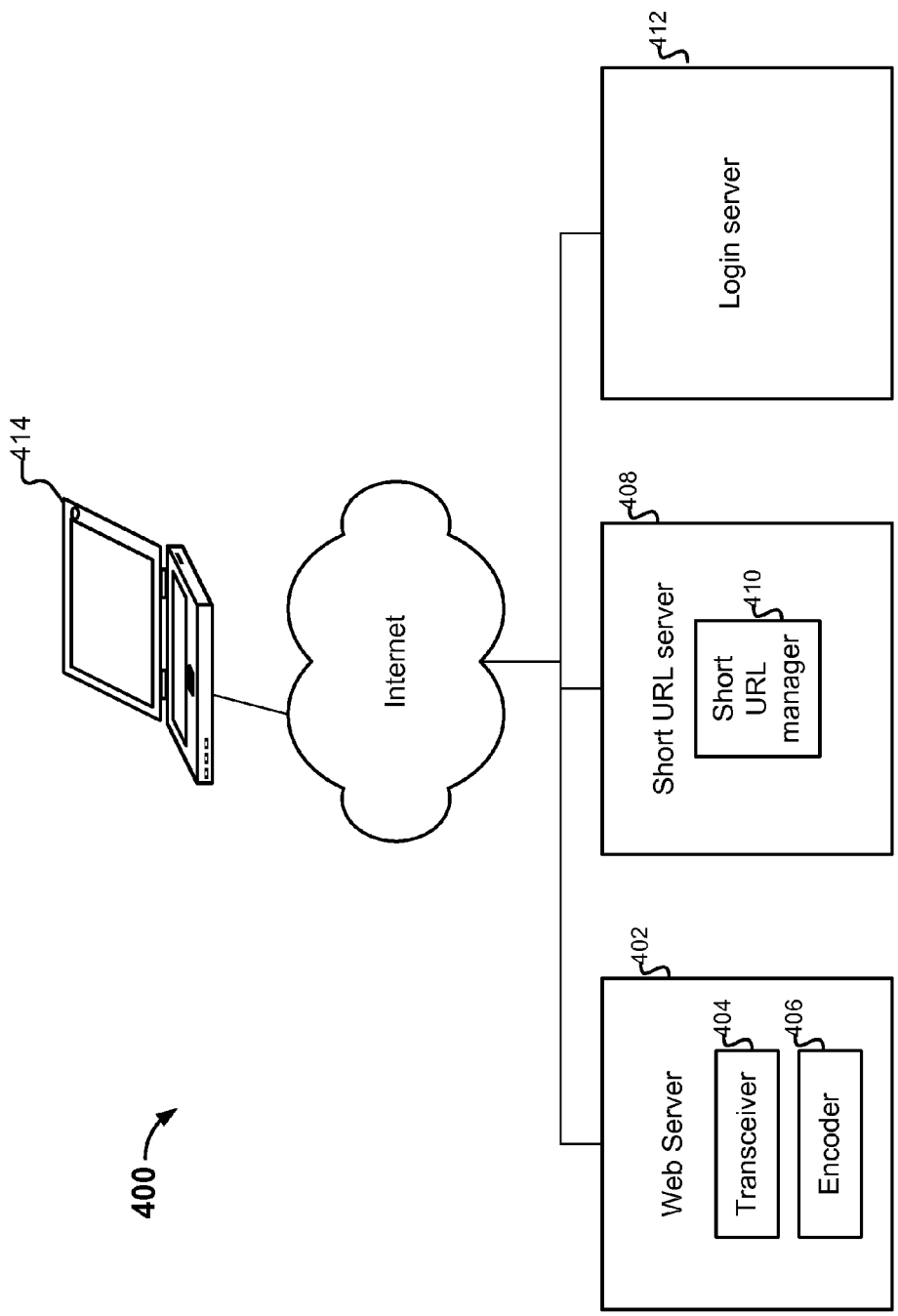
FIG. 4 is a block diagram illustrating an embodiment of a system configured to prevent login failures by reducing the length of a combined URL.

FIG. 4 is a block diagram illustrating an embodiment of a system configured to prevent login failures by reducing the length of a combined URL.

In the example shown, a web platform 400 includes a web server 402 comprising a transceiver 404 and an encoder 406, a short URL server 408 comprising a short URL manager 410, and a login server 412.

A user uses a client device 414 to access web pages maintained by web server 402 via a network such as the Internet. The client device can be a laptop computer, a desktop computer, a tablet, a mobile device, a smart phone, a wearable networking device, or any other appropriate computing device. In some embodiments, a web browser client or a standalone application client is installed at each client device to enable the user to access web pages provided by web platform 300.

Transceiver 404 (which can be included as a component of web server 402 or be separate from the web server) is configured to: receive a user access request from the client and obtain the original page address; and later when the user is authenticated, send the requested page to the client.

Encoder 406 (which can be located within the page server or be independently connected to the page server) is configured to encode at least a portion of the original page address to generate the encoded portion, and to generate a short address that includes the encoded portion. In some embodiments, the encoder implements the MD5 process to encode the original page address and generate the short address.

Short URL manager 410 (which can be located within a short URL server 408 or be independently connected to a server) is configured to maintain a mapping of at least the encoded portion and the original page address and determine a login address. In some embodiments, the original page address and the encoded portion are saved in a table. The short URL manager is further configured to form the login server address using the short URL, and redirecting the client to the login server. In addition, after the login succeeds, the short URL manager uses the short URL that is included in the redirected request to obtain the encoded portion, and use the encoded portion to look up the corresponding original address and access the page.

Login server 412 is configured to perform login authentication for the user, and once the user is successfully logged in, redirect the client to the short URL manager.

In the example described above, each server may be implemented using one or more computing devices such as a computer, a multi-processor system, a microprocessor based system, a special purpose device, a distributed computing environment including any of the foregoing systems or devices, or other appropriate hardware/software/firmware combination that includes one or more processors, and memory coupled to the processors and configured to provide the processors with instructions. A system such as 100 can be used to implement one or more servers.

The components described above such as transceiver, encoder, short URL manager, etc., can be implemented as software components executing on one or more general purpose processors, as hardware such as programmable logic devices and/or Application Specific Integrated Circuits designed to perform certain functions, or a combination thereof. In some embodiments, the components can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present application. The components may be implemented on a single device or distributed across multiple devices. The functions of the components may be merged into one another or further divided into multiple sub-components.

Figure 5:
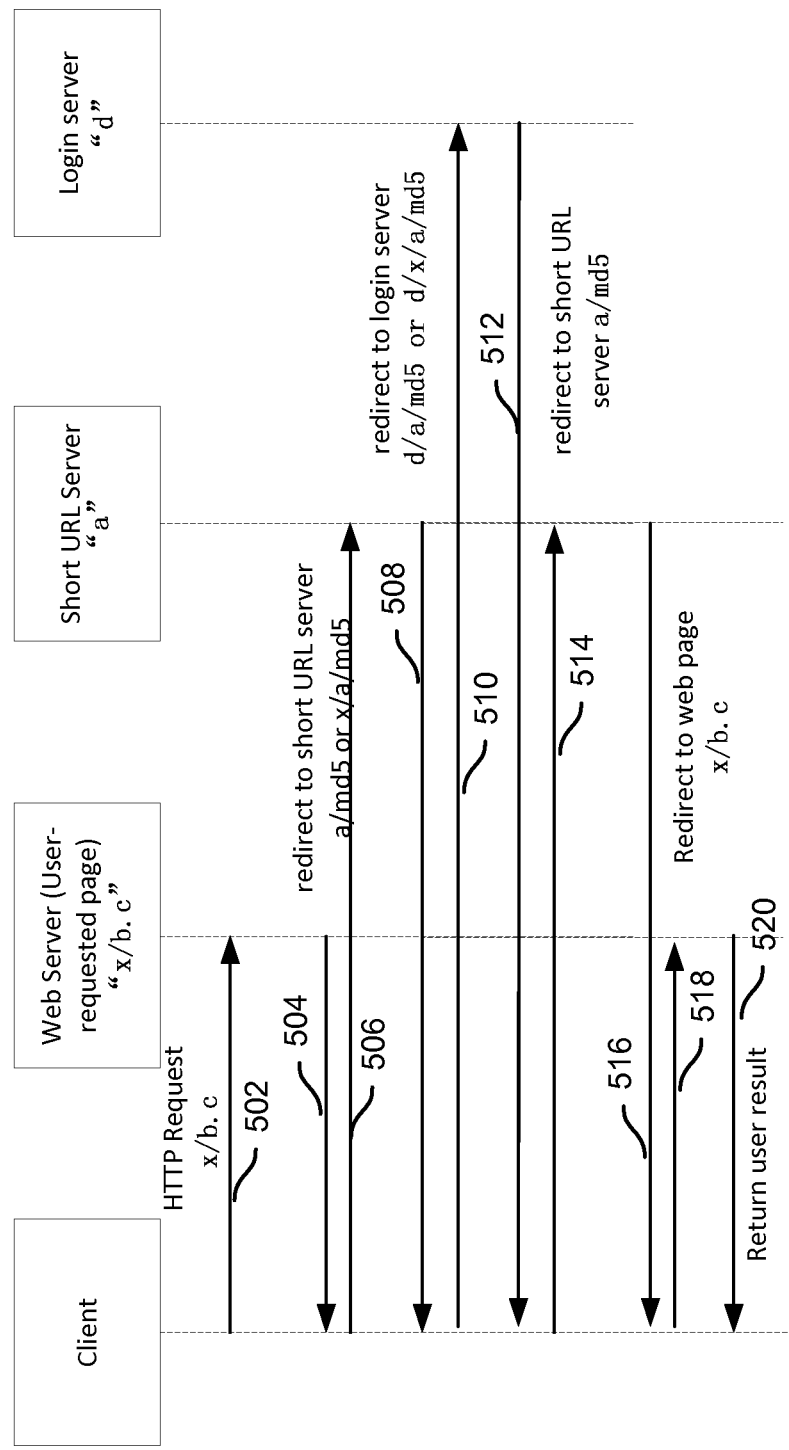
FIG. 5 is a diagram illustrating an example sequence of messages that are exchanged during process 300.

FIG. 5 is a diagram illustrating an example sequence of messages that are exchanged during process 300.

Initially, the client browser issues an HTTP request 502 to go to the user-requested page (e.g., to go to the web server x and access a file specified at path b.c based on the address of x/b.c). When the web server determines that the user has not logged in, the original page address of the user-requested page is encoded, and a short URL (e.g., a/md5 or x/a/md5) is generated by combining the encoded portion and the domain name of the short URL server. The short URL is sent to the client in a response 504 to redirect the client. Accordingly, the client sends another request 506 to the address specified by the short URL. The short URL server, which receives the request, saves the mapping of the encoded portion and the original page address. It further generates a login address based on the short URL that is received and a login server address, and sends a response 508 to redirect the client to the login server. The client makes a request 510 to the login server for the user to perform login. Once the user successfully logs in, the login server uses the short URL that is received in request 510 to generate a response 512 to redirect the client to the short URL server. The client makes another request 514, which includes the encoded portion, to the short URL server, which looks up the original page address based on the encoded portion included in request 514, and sends a response 516 to redirect the client to the web server. The client obtains the original page address from response 516, makes a request 518 based on the original page address. This time, since the user has successfully logged in, the web server will return the content of the originally requested page in a response 520.

Managing website access using a shortened address has been disclosed. The technique disclosed herein significantly reduces the likelihood of login redirect failure due to the length of the address used during the redirect.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for managing website access for a user who is initially not logged in to a website, comprising:
   receiving a request sent by the user via a client to access a webpage that requires the user to log into the website, the request comprising an original page address of the webpage;
   encoding, using a computer processor, at least a portion of the original page address to generate an encoded portion, the encoded portion being substantially shorter in length than at least the portion of the original page address that is encoded;
   generating a short address that includes the encoded portion combined with a domain name of a short URL management server;
   redirecting the client using the short address;
   maintaining a mapping of at least the encoded portion and the original page address;
   redirecting, after the client is redirected using the short address, the client to a login server for the user to perform login using a login address that is based at least in part on the short address;
   in the event that the user successfully logs in at the login server, redirecting the client based at least in part on the short address; and
   determining an original page address corresponding to the website based on the mapping of at least the encoded portion and the original page address.

2. The method of claim 1, further comprising providing the client with access to the web page corresponding to the original page address using the determined original page address.

3. The method of claim 1, wherein encoding at least a portion of the original page address to generate the encoded portion includes applying MD5 to at least the portion of the original page address.

4. The method of claim 1, wherein the short address further comprising a domain name of a short universal resource locator (URL) manager.

5. The method of claim 1, wherein maintaining a mapping of at least the encoded portion and the original page address includes storing at least the encoded portion and the original page address, wherein at least the encoded portion is used as an identifier to lookup a stored original page address.

6. The method of claim 1, wherein the login address comprises the short address and a login server domain name.

7. The method of claim 1, wherein determining the original page address based on the mapping of at least the encoded portion and the original page address includes:
   extracting the encoded portion from the short address; and
   using the encoded portion to lookup in a database the original page address.

8. The method of claim 1, wherein:
   the login address includes the short address and a domain name of a login server.

9. A system for managing website access for a user who is initially not logged in to a website, comprising:
   one or more processors configured to:
      receive a request sent by the user via a client to access a webpage that requires the user to log into the website, the request comprising an original page address of the webpage;
      encode at least a portion of the original page address to generate an encoded portion, the encoded portion being substantially shorter in length than at least the portion of the original page address that is encoded;
      generate a short address that includes the encoded portion combined with a domain name of a short URL management server;
      redirect the client using the short address;
      maintain a mapping of at least the encoded portion and the original page address;
      redirect, after the client is redirected using the short address, the client to a login server for the user to perform login using a login address that is based at least in part on the short address;
      in the event that the user successfully logs in at the login server, redirect the client based at least in part on the short address; and
      determine the original page address based on the mapping of at least the encoded portion and an original page address corresponding to the website; and
   a memory coupled to the one or more processors and configured to provide the one or more processors with instructions.

10. The system of claim 9, wherein the one or more processors are further configured to provide the client with access to the web page corresponding to the original page address using the determined original page address.

11. The system of claim 9, wherein to encode at least a portion of the original page address to generate the encoded portion includes to apply MD5 to at least the portion of the original page address.

12. The system of claim 9, wherein the short address further comprising a domain name of a short universal resource locator (URL) manager.

13. The system of claim 9, wherein to maintain a mapping of at least the encoded portion and the original page address includes to store at least the encoded portion and the original page address, wherein at least the encoded portion is used as an identifier to lookup a stored original page address.

14. The system of claim 9, wherein the login address comprises the short address and a login server domain name.

15. The system of claim 9, wherein to determine the original page address based on the mapping of at least the encoded portion and the original page address includes to:
   extract the encoded portion from the short address; and
   use the encoded portion to lookup in a database the original page address.

16. The system of claim 9, wherein:
   the login address includes the short address and a domain name of a login server.

17. A computer program product for managing website access for a user who is initially not logged in to a website, the computer program product being embodied in a tangible non-transitory computer readable storage medium and comprising computer instructions for:
   receiving a request sent by the user via a client to access a webpage that requires the user to log into the website, the request comprising an original page address of the webpage;
   encoding at least a portion of the original page address to generate an encoded portion, the encoded portion being substantially shorter in length than at least the portion of the original page address that is encoded;
   generating a short address that includes the encoded portion combined with a domain name of a short URL management server;
   redirecting the client using the short address;
   maintaining a mapping of at least the encoded portion and the original page address;
   redirecting, after the client is redirected using the short address, the client to a login server for the user to perform login using a login address that is based at least in part on the short address;

in the event that the user successfully logs in at the login server, redirecting the client based at least in part on the short address; and determining an original page address corresponding to the website based on the mapping of at least the encoded portion and the original page address.

\* \* \* \* \*